Patented Feb. 24, 1953

2,629,700

UNITED STATES PATENT OFFICE 2,629,700

HEAT STABILIZER FOR VINYL RESINS

Sylvester S. Caldwell, Akron, and George J. Chertoff and Garry B. Curtiss, Shaker Heights, Ohio; said Caldwell and said Curtiss assignors to said Chertoff No Drawing. Application September 5, 1951, Serial No. 245,265

3 Claims. (Cl. 260—23)

This invention relates to vinyl resins and more particularly to polymers and copolymers of vinyl resins stabilized against the action of light and heat.

This application is a continuation-in-part of our copending application Serial No. 57,414, filed October 29, 1948, and now abandoned.

One of the objects of the present invention is to provide novel stabilizing materials which prevent deterioration of vinyl resins at elevated temperatures or when subjected to direct sunlight.

Another object of the present invention is to provide a novel combination of a vinyl halide, its polymers and copolymers, with a small amount of a stabilizer comprising tin in stannous form.

Other objects and advantages of our invention will be apparent from the following specification.

This invention pertains to a heat stabilizer and processing aid for plastic compositions made of vinyl resins and to methods of making the same. Its principal object is to provide new and improved stabilizing materials which have definite advantages in reducing or preventing deterioration of vinyl resins at elevated temperatures.

The fact that resins made from a vinyl halide, its polymers and copolymers, are unstable at elevated temperatures has been recognized since the early stages of the work on vinyl plastics. The prevention of the discoloration of vinyl resin plastics on exposure to the heat required for normal processing and fabrication has been one of the major problems connected with the utilization of these materials for commercial products. Numerous organic and inorganic compounds have been described as being effective for this purpose. Among these the compounds of lead, such as the oxides, basic carbonates and silicates, and the organometallic compounds of tin, such as tetrabutyl tin-laurate, dibutyl tin di-laurate and dibutyl tin diacetate have perhaps had the most general commercial acceptance.

The inorganic lead compounds, such as litharge (PbO) and basic lead carbonate

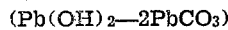

$(Pb(OH)_2—2PbCO_3)$ are quite effective as heat stabilizers for vinyl plastic compositions, but they cause turbidity in films and sheeting which is sometimes objectionable and tend to accelerate decomposition of the vinyl plastic in direct sunlight. The latter effect can be minimized by addition of a light stabilizer to the plastic composition, but the turbidity cannot be overcome. Organic lead compounds, such as lead stearate, and the organo-metallic lead compounds, do not cause turbidity in vinyl plastics, but all lead compounds have the objectionable feature of being toxic. Another difficulty that has been experienced with lead compounds is that when these are used in vinyl upholstery materials in contact with the sponge rubber commonly employed as cushioning in automobile seats and upholstered furniture, the sulphur in the sponge rubber reacts with the lead compounds and causes discoloration of the vinyl upholstery due to the formation of lead sulfide.

Certain organic compounds of tin, such as tetra butyl tin laurate, dibutyl tin di-laurate, dibutyl tin diacetate and tin tetraphenyl, have been described as effective heat stabilizers for vinyl resins and plastic compositions and these do not have the bad qualities of the lead compounds mentioned above.

The element tin has two chemical valences, namely, stannous tin with a valence of two and stannic tin with a valence of four, forming stannous and stannic compounds, respectively. All of the tin compounds disclosed thus far as effective heat stabilizers for vinyl resins are stannic compounds in which the tin has a valence of four. The present invention is based upon the discovery that certain stannous tin compounds are far more effective as heat stabilizers for vinyl resins than any of the stannic compounds heretofore proposed. Vinyl resins and compositions possessing greatly improved resistance to heat are obtained by incoporation therein, either during the manufacture of the resin or formulation of the plastic composition, of small amounts of stannous tin soaps and salts of organic acids such as lauric, myristic, palmitic, stearic, arachidic, behenic, oleic, linoleic, linolenic, ricinoleic, salicylic, succinic, benzoic, tartaric, lactic, naphthenic, phthalic, and abietic.

Among the most effective of these stabilizers are the stannous salts of the above mentioned fatty acids such as stannous laurate, stannous stearate, stannous oleate, stannous palmitate, stannous arachidate, stannous behenate, and stannous linoleate. These may be used separately or as the mixtures obtained when commercial grades of fatty acids are employed in the preparation of the stannous salts. For example, the normal commercial grades of stearic acid contain substantial quantities of oleic and palmitic acids so the stannous salt prepared from this material is a mixture of stannous stearate, stannous oleate, and stannous palmitate.

The salts of the above mentioned organic acids, namely, salicylic, succinic, benzoic, tartaric, lactic, naphthenic, phthalic and abietic are good stabilizers when used as suggested for the stannous soaps.

To illustrate one use of our invention, we will describe the preparation of stannous stearate and the method of incorporation into the vinyl resin.

EXAMPLE I

First prepare a solution of sodium stearate by adding 28.3 parts by weight of caustic soda dissolved in 300 parts by weight of water to 198.5 parts by weight of stearic acid in 750 parts by weight of water and heat to boiling with agitation. If preferred, a chemically equivalent amount of soda ash, or of potassium hydroxide, can be used instead of caustic soda. After boiling for one-half hour to accomplish complete saponification, add a sufficient amount of cold water to reduce the temperature of the soap solution to approximately 145° F. Stannous stearate is then precipitated by adding a solution of 84.9 parts by weight of stannous chloride ($SnCl_2 \cdot 2H_2O$) in 100 parts by weight of water to the sodium stearate solution prepared as above and agitating the mixture for one-half hour. Keep the amount of water low in the sodium stearate and stannous chloride solutions to prevent hydrolysis. Filter the reaction mixture and wash the precipitated stannous stearate with water several times to remove soluble salts. Dry the stannous stearate at 140° to 170° F. to a moisture content of 1% or less.

EXAMPLE II

If a stannous stearate of high purity is desired for use in vinyl plastic films and sheeting of high transparency, it is necessary to avoid hydrolysis of the tin salts. This can be done by precipitation from solutions in alcohol. To carry out this procedure prepare a solution of sodium stearate in alcohol by adding 28.3 parts by weight of caustic soda dissolved in 480 parts by weight of 95% alcohol to 198.5 parts by weight of stearic acid in 960 parts by weight of 95% alcohol and heat to 170° F. with agitation. Hold at this temperature for one-half hour to accomplish complete saponification, and then add a sufficient amount of cold alcohol to reduce the temperature of the soap solution to approximately 145° F. Dissolve 84.9 parts by weight of stannous chloride ($SnCl_2 \cdot 2H_2O$) in 125 parts by weight of 95% alcohol and add this solution to the soap solution and agitate the mixture for one-half hour. Continue the agitation and add an equal volume of water thereby precipitating the stannous stearate. Filter and remove soluble salts from the stannous stearate by washing several times with water. Dry the stannous stearate at 140° to 170° F. to a moisture content of 1% or less.

EXAMPLE III

Stannous stearate melts at approximately 150° F. If the material is dried at a sufficiently high temperature to cause it to melt in the dryer the rate of drying is materially decreased and the material becomes more difficult to handle. By co-precipitating stannous stearate with a metallic soap having a high melting point, such as barium or calcium stearate, it is possible to raise the softening point of the mixture so that it can be dried at temperatures above the boiling point of water without melting. This not only increases the efficiency of the drying operation, but the presence of barium or calcium stearate reduces the tendency of the stannous stearate to oxidize and become dark on drying. Such co-precipitated materials can be prepared by substituting 20 parts by weight of hydrated calcium chloride ($CaCl_2 \cdot 2H_2O$), or 21 parts by weight of barium chloride ($BaCl_2 \cdot 2H_2O$), for 19.9 parts by weight of the stannous chloride ($SnCl_2 \cdot 2H_2O$) used in the procedure given in Example I above. The co-precipitates thus formed will contain approximately 3 parts by weight of stannous stearate to one part by weight of calcium stearate, or barium stearate, respectively. Such co-precipitates have been found to be substantially equal to the pure stannous stearate in their heat stabilizing effect on vinyl resins and are much easier to dry and pulverize than the pure stannous stearate because of their higher softening points. Co-precipitation also affords an economical means of obtaining complete conversion of the sodium stearate to insoluble metallic stearates and thus simplifies the washing operation by giving a reaction mixture free of soluble soaps.

To incorporate these stabilizing compounds of Examples I, II and III into the resin composition any of the methods heretofore known may be employed which will effect an intimate dispersion throughout the resin mass. Milling on differential rolls is one such method. The amounts necessary to effect a desirable degree of heat stability will vary from about 1.0% to about 5.0% by weight of the vinyl resin. In formulating the plastic compositions for various uses there may be included any of the commonly employed solvents, plasticizers, fillers, pigments, coloring agents, and other modifying materials that are without detrimental effect upon the heat stability afforded by these new stabilizers.

To illustrate the effectiveness of these new stabilizers they are compared with a number of inorganic and organo-metallic compounds in the following table. The resin employed in our invention for incorporation of our stabilizing compounds was a commercial grade of vinyl copolymer containing about 95% vinyl chloride and 5% diethyl maleate. This was plasticized with the normal amount of dioctyl phthalate to give a soft plastic composition, about 40 parts dioctyl phthalate to 100 parts of vinyl copolymers. The stabilizers, in amounts of 3.0% by weight of the vinyl resin, were thoroughly dispersed in the plastic mass by milling on a two roll mill at a temperature of 200° F. The temperature was then increased to 325° F. and the milling continued until definite decomposition, as evidenced by discoloration, took place. The time of milling at 325° F. required to cause initial discoloration and definite discoloration or failure, is indicated in each case.

Heat stability tests

| Stabilizer | Time to Discoloration—Minutes at 325° F. | |
| --- | --- | --- |
| | Initial | Failure |
| Contol (No Stabilizer) | 5 | 25 |
| Lead Sterate | 35 | 45 |
| Magnesium Oxide | 25 | 45 |
| Beryllium Stearate | 15 | 35 |
| Antimony Oxide | 10 | 25 |
| Magnesium Stearate | 25 | 45 |
| Barium Stearate | 10 | 35 |
| Aluminum Distearate | 15 | 25 |
| Calcium Stearate | 25 | 60 |
| Zinc Stearate | 10 | 50 |
| Cadmium Laurate | 15 | 60 |
| Cadmium Stearate | 25 | 60 |
| Stannic Stearate (1) | 5 | 25 |
| Stannic Stearate (2) | 5 | 25 |
| Stannous Stearate | 45 | 60+ |
| Stannous Arachidate-Behenate | 60 | |
| Stannous Soap of Fish Oil Acids | 35 | 60+ |

NOTES:
Stannic Stearate (1) was prepared from aqueous solutions of tin tetrachloride and sodium stearate.
Stannic Stearate (2) was prepared from alcoholic solutions of tin tetrachloride and sodium stearate.

The stannous stearate mentioned above contains 17.35 per cent by weight of tin.

In addition to being effective heat stabilizers our improved stannous compounds have also been found to contribute to the stability of vinyl plastic compositions in direct sunlight. The following results were obtained when some of the compositions given above were exposed in an accelerated fading machine containing a light source high in ultra-violet radiations.

*Light stability tests*

| Stabilizer | Hours to Discoloration |
|---|---|
| Control (No Stabilizer) | 109 |
| Stannic Stearate | 130 |
| Stannous Stearate | 307 |

The stannous soaps are easy to incorporate into the vinyl plastic because they soften or melt at the temperatures normally employed in the mixing of these compositions and then serve as processing aids during the milling, calendering, extrusion, or molding operations. They do not give off objectionable vapors or odors during the processing operations, are non-toxic, and serve as parting or non-blocking agents by preventing adhesion of the composition to mill rolls, calender rolls, and molds, or to itself when fabricated into film, sheets, and other usual forms.

To summarize, it has been found that stannous soaps such as stannous laurate, stannous stearate, stannous oleate, stannous palmitate, stannous arachidate, stannous behenate, and stannous linoleate impart the following useful properties to vinyl plastic compositions:

1. Improve resistance to elevated temperatures.
2. Improve resistance to light.
3. Improve processing qualities.

In addition to the above, these new stabilizers are non-toxic, substantially odorless, do not cause discoloration in contact with vulcanized rubber, give clear and colorless films, and prevent the stock from sticking to mill and calender rolls, to molds, and to itself.

What we claim is:

1. A composition comprising a vinyl halide polymer subject to deterioration at elevated temperatures and, as heat and light stabilizer, a stannous salt of an organic acid chosen from the group consisting of lauric, myristic, palmitic, stearic, arachidic, behenic, oleic, linoleic, linolenic, recinoleic, salicyclic, succinic, benzoic, tartaric, lactic, naphthenic, phthalic, and abietic acids.

2. A composition comprising the product of polymerization of a mass comprising a vinyl halide polymer subject to deterioration at elevated temperatures, and a heat and light stabilizer in an amount of approximately one to five per cent by weight of said mass, said stabilizer comprising a stannous salt of an organic acid chosen from the group consisting of lauric, myristic, palmitic, stearic, arachidic, behenic, oleic, linoleic, linolenic, recinoleic, salicyclic, succinic, benzoic, tartaric, lactic, naphthenic, phthalic and abietic acids.

3. A composition comprising a vinyl halide polymer subject to deterioration at elevated temperatures and, as a heat and light stabilizer, a small amount of a stannous soap.

SYLVESTER S. CALDWELL.
GEORGE J. CHERTOFF.
GARRY B. CURTISS.

REFERENCES CITED

The following references are of record in the file of this patent:

UNITED STATES PATENTS

| Number | Name | Date |
|---|---|---|
| 2,476,833 | Albert | Dec. 9, 1947 |

FOREIGN PATENTS

| Number | Country | Date |
|---|---|---|
| 381,013 | Italy | June 17, 1940 |